United States Patent

Wada et al.

[11] Patent Number: 5,984,743
[45] Date of Patent: Nov. 16, 1999

[54] COOLING APPARATUS FOR AUXILIARY FUEL TANK IN OUTBOARD MOTOR

[75] Inventors: Tetsu Wada; Sadafumi Shidara; Masaki Tsunoda, all of Wako, Japan

[73] Assignee: Honda Giken Kogyo Kabushiki Kaisha, Tokyo, Japan

[21] Appl. No.: 09/158,928

[22] Filed: Sep. 23, 1998

[30] Foreign Application Priority Data

Sep. 24, 1997 [JP] Japan ........................... 9-259034

[51] Int. Cl.$^6$ .................................................. B63H 21/10
[52] U.S. Cl. .............................................. 440/88; 440/900
[58] Field of Search ........................ 440/1, 2, 88, 89, 440/900

[56] References Cited

U.S. PATENT DOCUMENTS

| 5,383,803 | 1/1995 | Pilgrim | 440/88 |
| 5,439,404 | 8/1995 | Sumigawa | 440/88 |

FOREIGN PATENT DOCUMENTS 9-144617  6/1997  Japan .

*Primary Examiner*—Stephen Avila
*Attorney, Agent, or Firm*—Nikaido, Marmelstein, Murray & Oram LLP

[57] ABSTRACT

An outboard motor includes an engine which is tiltable from a first position to a second position, and a drive mechanism connected to the engine for driving a propeller. When the engine is in the second position, the drive means is tilted upward. An auxiliary fuel tank is connected to the engine for storing fuel returning from a fuel injection valve side of the engine. A high-pressure fuel pump is connected to the engine and the auxiliary fuel tank for pumping fuel from the auxiliary fuel tank to the fuel injection valve side of the engine. A water jacket is connected to the auxiliary fuel tank, for cooling the fuel which is stored in the auxiliary fuel tank. A water pump is driven by the engine to supply water from an external water source to an inlet of the water jacket. A first discharge passage is connected to an outlet of the water jacket. An engine cover is provided, which covers the engine, the fuel pump, and the auxiliary fuel tank. The inlet of the water jacket is configured at a lowest portion of the water jacket when the engine is in the second position. The outboard motor also includes a second discharge passage attached to the water jacket, with the second discharge passage being connected to the inlet and being configured to be below the inlet when the engine is in the second position.

8 Claims, 16 Drawing Sheets

COOLING APPARATUS FOR AUXILIARY FUEL TANK IN OUTBOARD MOTOR

BACKGROUND OF THE INVENTION

1. Field of the Invention

The present invention relates to a cooling apparatus for an auxiliary fuel tank in an outboard motor. More specifically, the invention is directed to an improvement in an apparatus in which an auxiliary fuel tank capable of storing extra fuel returning from a fuel injection valve side of an engine, and a high-pressure fuel pump for pumping fuel stored in the auxiliary fuel tank to the fuel injection valves of the engine, are housed in an engine cover. The engine cover is configured to cover the engine, a water jacket which cools the stored fuel is formed on the auxiliary fuel tank, a water pump which is driven by the engine to supply external water is connected to the inlet of the water jacket, and a discharge passage which is connected to the outlet of the water jacket.

2. Description of the Prior Art

A cooling apparatus for an auxiliary fuel tank in an outboard motor is already known as disclosed in, for example, Japanese Patent Laid-Open No. 9-144617.

In a cooling apparatus for an auxiliary fuel tank in an outboard motor, to maintain the durability of a water jacket, it is necessary that no cooling water remain in the water jacket when the engine is stopped. However, no consideration has been given to such a problem of conventional types of cooling apparatus. In the cooling apparatus disclosed in the prior art, since the inlet and the outlet of the water jacket are provided in the rear wall thereof, if the outboard motor is tilted up, the inlet and the outlet are disposed at an upper portion of the water jacket. Therefore cooling water remains in the water jacket, decreasing the durability thereof.

The present invention has been developed in view of the above-described problem; an object of the present invention is to provide a cooling apparatus for an auxiliary fuel tank in an outboard motor, which is capable of reliably discharging cooling water from the water jacket of the auxiliary fuel tank when an engine is stopped, and even when the outboard motor is tilted up.

SUMMARY OF THE INVENTION

To achieve the above object, in accordance with a first feature of the present invention, a cooling apparatus is provided for an auxiliary fuel tank in an outboard motor. The motor is such that an auxiliary fuel tank therefore is capable of storing extra fuel returning from the fuel injection valve side of an engine. A high-pressure fuel pump is provided for pumping fuel stored in the auxiliary fuel tank to the fuel injection valves of the engine. These components are housed in an engine cover which covers the engine, the auxiliary fuel tank and the fuel pump. A water jacket which cools the stored fuel is formed on the auxiliary fuel tank, the water pump is driven by the engine to supply external water and is connected to an inlet of the water jacket, and a discharge passage is connected to an outlet of the water jacket. The inlet of the water jacket is disposed so as to be located in approximately the lowest portion of the water jacket when the outboard motor is tilted up to raise the propeller. A second discharge passage is located below the inlet at least when the outboard motor is tilted up, and is connected to the inlet.

When the engine is stopped and the outboard motor is tilted up, the cooling water in the water jacket of the auxiliary fuel tank naturally flows out to the second discharge passage from the inlet, which has been located to approximately the lowest portion of the water jacket. It is therefore possible to prevent the cooling water from remaining in the water jacket, whereby it is possible to avoid the occurrence of rust and corrosion of the internal surfaces of the water jacket due to the remaining water, and also to avoid damage from possible freezing of the remaining water in cold environments.

In accordance with a second feature of the present invention, the second discharge passage serves as a water measuring passage which opens on an outside face of the outboard motor.

In accordance with the second feature, it is possible to discharge the cooling water in the water jacket to the outside by means of the regular water measuring passage when the outboard motor is tilted up.

In accordance with a third feature of the present invention, an outlet of the water measuring passage is opened on the outside face of the outboard motor which is directed downward when the outboard motor is tilted up.

In accordance with the third feature, when the outboard motor is tilted up, it is possible to reliably discharge the cooling water in the water jacket to the outside without allowing the cooling water to remain in the water measuring passage. It is therefore possible to reduce or prevent the occurrence of rust and corrosion of the internal surfaces of the water jacket due to the remaining water and the water measuring passage, and to prevent damage from freezing of the remaining water in cold environments.

In accordance with a fourth feature of the present invention, there is provided another embodiment of a cooling apparatus for an auxiliary fuel tank in an outboard motor. The engine has a high-pressure fuel pump for pumping fuel stored in the auxiliary fuel tank to the fuel injection valves of the engine. These components are housed in an engine cover which covers the engine, the auxiliary fuel tank and the fuel pump. A water jacket cools the stored fuel which is formed on the auxiliary fuel tank, the water pump is driven by the engine to supply external water and is connected to an inlet of the water jacket, and a discharge passage is connected to an outlet of the water jacket. The inlet of the water jacket is disposed so as to be located in approximately the lowest portion of the water jacket when the outboard motor is tilted up, and the outlet is connected to the discharge passage in a portion which is located below the outlet when the outboard motor is tilted up.

In accordance with the fourth feature, when the engine is stopped and the outboard motor is tilted up, the cooling water in the auxiliary fuel tank naturally flows out to the regular discharge passage from the outlet which has been located to approximately the lowest portion of the water jacket. Accordingly, it is possible to prevent the cooling water from remaining in the water jacket.

BRIEF DESCRIPTION OF THE DRAWINGS

The above and other objects, features and advantages of the present invention will become apparent from the following description of preferred embodiments, taken in conjunction with the accompanying drawings, wherein.

DESCRIPTION OF THE PREFERRED EMBODIMENTS

Figure 1:
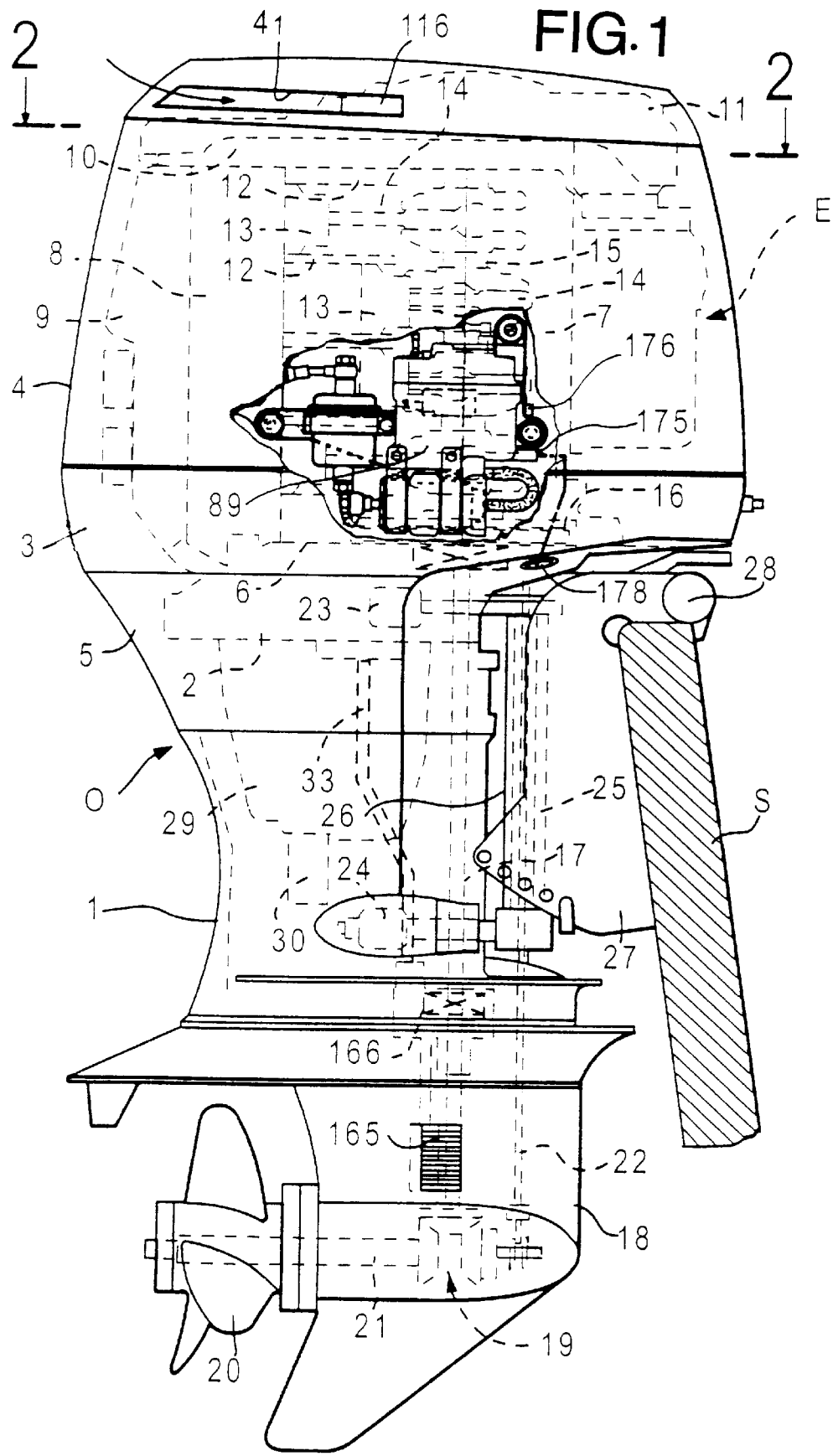
FIG. 1 is a side view of an outboard motor of a first embodiment according to the present invention.

Referring to FIG. 1, an outboard motor O which serves as a power unit is provided with a mount case 2, which serves as an engine support, joined to an upper portion of an extension case 1. A water-cooled in-line type four-cylinder and four-cycle engine E is supported on the top of the mount case 2, with a crankshaft 15 vertically arranged therein. An under case 3 having an open top is joined to the mount case 2, and an engine cover 4 is detachably mounted on an upper portion of the under case 3. An engine compartment or engine room 36 which houses the engine E is defined by the mount case 2, the under case 3 and the engine cover 4.

An under cover 5 is mounted between the lower edge of the under case 3 and an edge near the upper end of the extension case 1 so as to cover the outside of the mount case 2.

The engine E is provided with a cylinder block 6, a crankcase 7, a cylinder head 8, a head cover 9, a lower belt cover 10 and an upper belt cover 11, and the cylinder block 6 and the bottom of the crankcase 7 are supported on the top of the mount case 2. Pistons 13 are slidably fitted in four cylinders 12 formed in the cylinder block 6, respectively, and the pistons 13 are linked, via connecting rods 14, to a vertically disposed crankshaft 15.

A drive shaft 17, which is connected together with a flywheel 16 to the lower end of the crankshaft 15, extends downwardly in the extension case 1. The lower end of the drive shaft 17 is connected to a propeller shaft 21 having propeller 20 at its rear end, via a bevel gear mechanism 19 provided in a gear case 18. The lower end of a shift rod 22 for changing the rotating direction of the propeller shaft 21 is connected to the front portion of the bevel gear mechanism 19.

A swivel shaft 25 is fixed between an upper mount 23 provided in the mount case 2 and a lower mount 24 provided in the extension case 1. Swivel case 26 which rotatably supports the swivel shaft 25 is supported as to vertically oscillate with respect to a stern bracket 27 mounted on a stern S, via a tilt shaft 28.

An oil pan 29 and an exhaust tube 30 are joined to the bottom of the mount case 2. Exhaust gas which has been discharged into the internal space of the extension case 1 from the exhaust tube 30 passes through the hollow portion of a boss portion of the propeller 20, and is discharged into outside water in which the lower unit of the engine is disposed.

Figure 2:
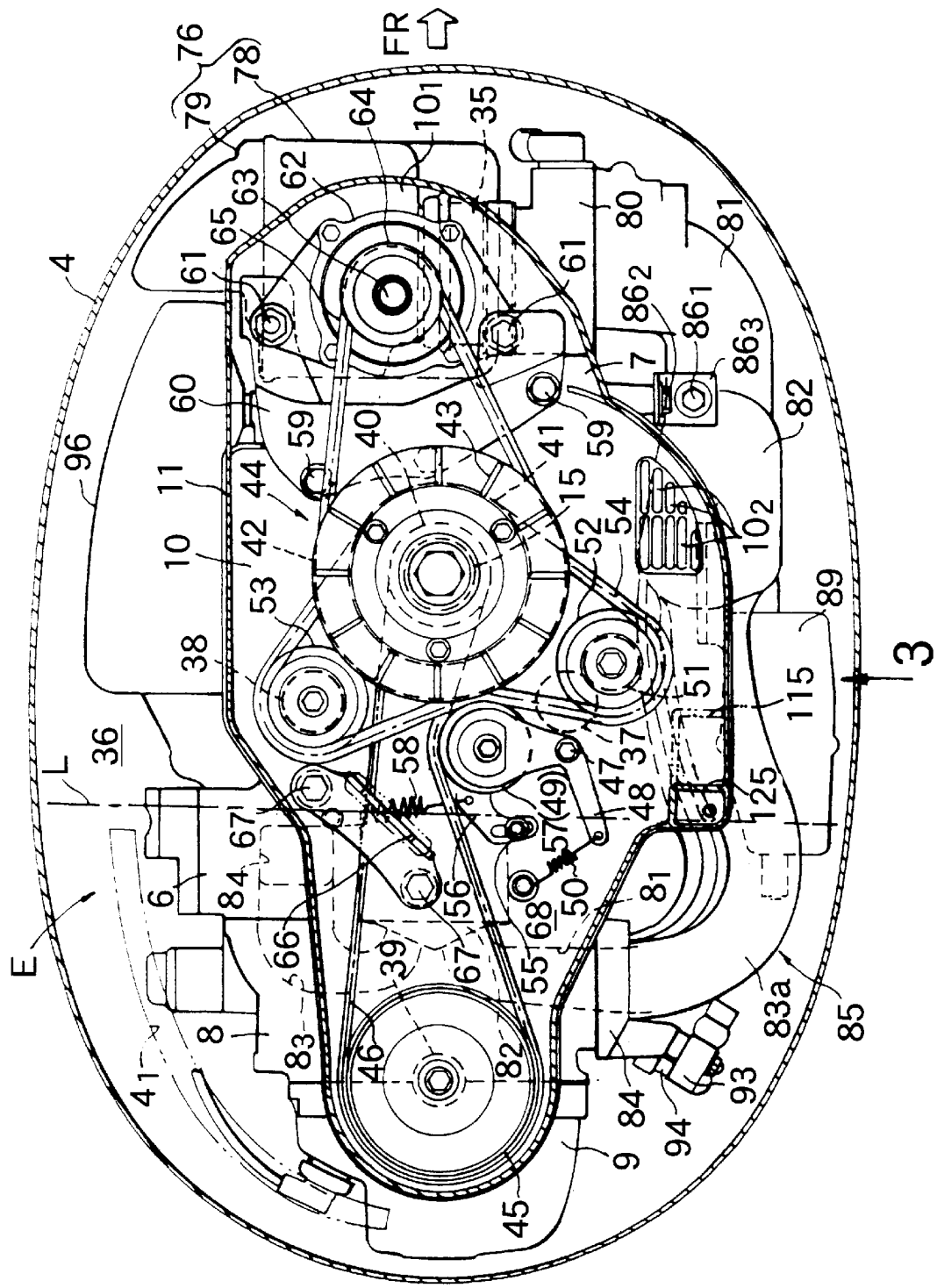
FIG. 2 is an enlarged cross-sectional view taken along a line 2—2 of FIG. 1.

As is apparent from FIG. 2, the engine E housed in the engine room 36 is provided with one camshaft 39 and two secondary balancer shafts 37 and 38 which are arranged in parallel with the crankshaft 15. The two secondary balancer shafts 37 and 38 are supported by the cylinder block 6 closer to the cylinder head 8 than the crankshaft 15, and the camshaft 39 is supported between the surfaces of contact between the cylinder head 8 and the head cover 9.

A pulley assembly 44 which integrally has a camshaft drive pulley 40, a secondary balancer shaft drive pulley 41, a generator drive pulley 42 and a cooling fan 43 is fixed to the upper end of the crankshaft 15. A camshaft driven pulley 45 fixed to the upper end of the camshaft 39 and the camshaft drive pulley 40 are connected by an endless belt 46. The diameter of the camshaft drive pulley 40 is set to a half of the diameter of the camshaft driven pulley 45 so that the camshaft 39 rotates at a speed which is one half of the speed of the crankshaft 15. A tension pulley 49 which is provided at one end of an arm 48 pivotally supported by a pin 47 is pressed against the outside surface of the endless belt 46 by the resilient force of a spring 50, whereby a predetermined tension is given to the endless belt 46.

A pair of secondary balancer shaft follower pulleys 52 and 53 are respectively fixed to an intermediate shaft 51 provided in the vicinity of the secondary balancer shaft 37 and to the secondary balancer shaft 38. The pair of secondary balancer shaft driven pulleys 52 and 53 and the secondary balancer shaft drive pulley 41 are connected by an endless belt 54. A tension pulley 57 provided at one end of an arm 56 pivotally supported by a pin 55 is pressed against the outside surface of the endless belt 54 by the resilient force of a spring 58, whereby a predetermined tension is given to the endless belt 54. The intermediate shaft 51 and the secondary balancer shaft 37 are connected by a pair of gears having the same diameter (not shown), and the diameter of the secondary balancer shaft drive pulley 41 is set to twice the diameter of each of the secondary balancer shaft follower pulleys 52 and 53, so that the pair of secondary balancer shafts 37 and 38 rotate in directions opposite to each other and at a speed which is twice the speed of the crankshaft 15.

A generator 62 is supported by two bolts 61 on a bracket 60 which is fixed to the top of the crankcase 7 by two bolts 59. A generator follower pulley 64 fixed to a rotating shaft 63 of the generator 62 and the generator drive pulley 42 are connected by an endless belt 65, and the generator 62 is driven by the crankshaft 15. Since the generator 62 is provided separately from the engine E in this manner, a general-purpose generator which is advantageous in terms of cost can be used, compared with a configuration in which a generator is incorporated in a flywheel provided on the crankshaft 15. Furthermore, it is also possible to readily increase the capacity of the generator 62.

The three belts 46, 54 and 65 which drive the camshaft 39, the two secondary balancer shafts 37 and 38 and the generator 62 are housed in a belt chamber 68 defined by the lower belt cover 10 and the upper belt cover 11. The lower belt cover 10 is provided with an opening portion $10_1$ which surrounds the periphery of the generator 62 and a plurality of slits $10_2$ in its bottom wall on the right side of the crankshaft 15, and air is introduced into the belt chamber 68 via these opening portion $10_1$ and the slits $10_2$.

Figure 3:
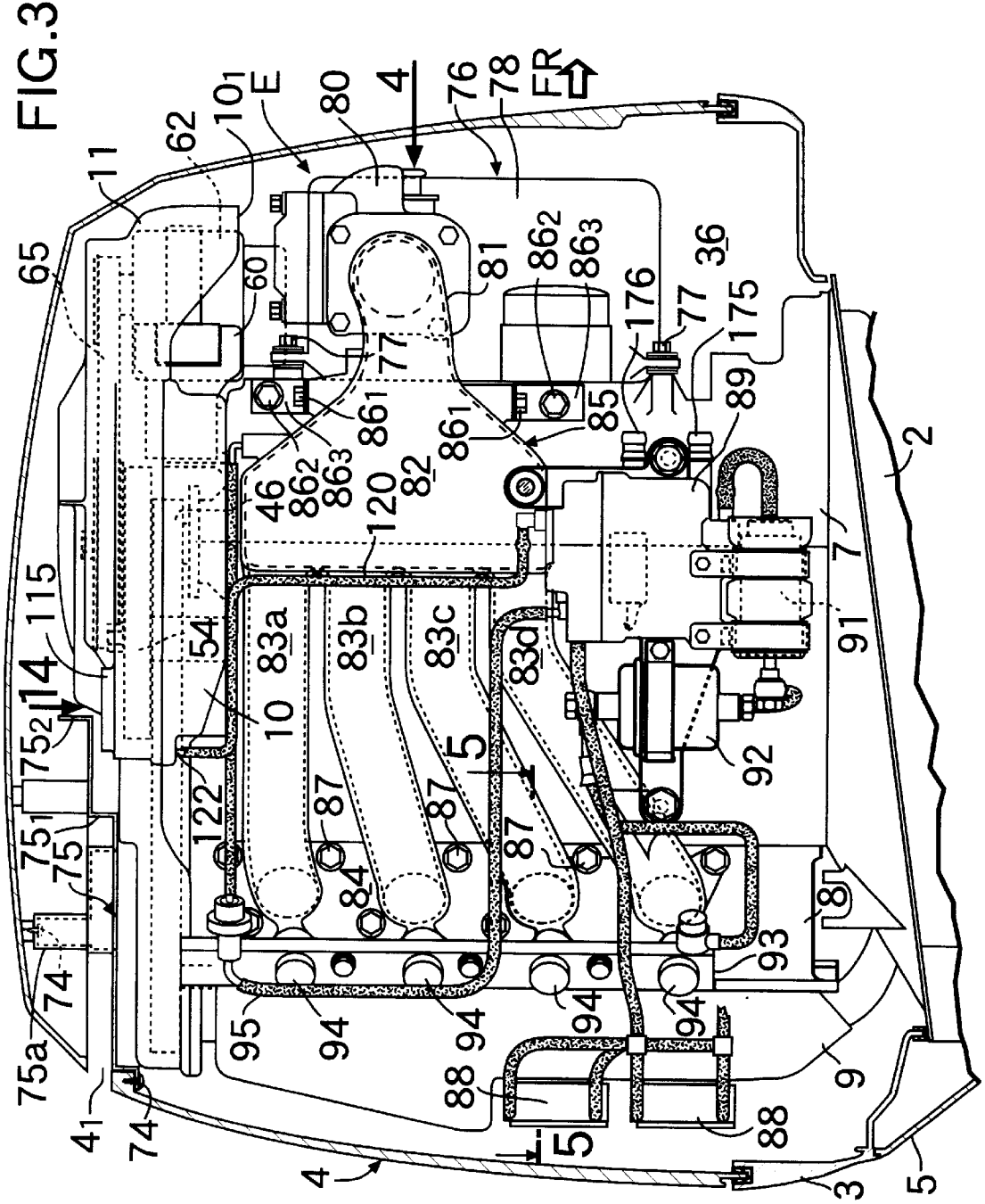
FIG. 3 is a view taken in the direction of an arrow 3 of FIG. 2.
Figure 4:
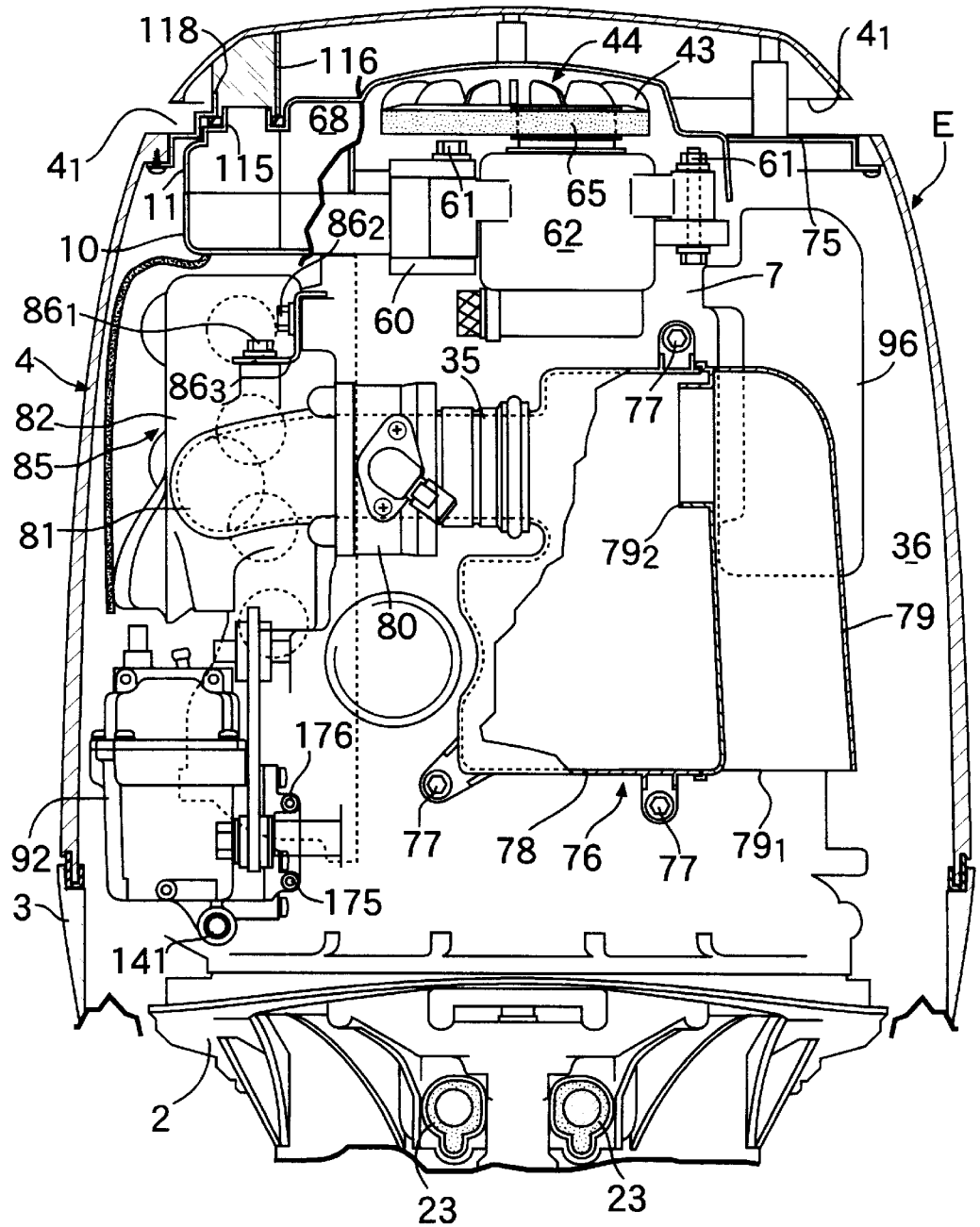
FIG. 4 is a view taken in the direction of an arrow 4 of FIG. 3.

As shown in FIGS. 2 to 4, a pair of right and left slit-like rear opening portions 41 are formed in an upper rear face of the engine cover 4. Guide plate 75, which extends forwardly from the lower edges of these rear opening portions $4_1$ and whose front end terminates at an intermediate portion between the front and rear sides of the engine room 36, is fixed to the internal surface of the engine cover 4. A rear edge portion and a boss 75a at the intermediate portion of the guide plate 75 are fixed to the internal surface of the engine cover 4 by tapping screws 73 and a tapping screw 74, respectively. Guide plate 75 is formed with two water draining steps $75_1$ and $75_2$ which are raised stepwise from the rear opening portion $4_1$ toward the engine room 36.

Air which is sucked through the rear opening portions $4_1$ passes forwardly through the space between the upper wall of the engine cover 4 and the guide plate 75, and flows up the two water draining steps $75_1$ and $75_2$. During flowing up, since the progress of water droplets contained in the air is prevented by the water draining steps $75_1$ and $75_2$, only the air is allowed to flow into the engine room 36 through the water draining steps $75_1$ and $75_2$, and is supplied to the intake of the engine E or serves to cool various portions of the outboard motor.

As shown in FIGS. 3 and 14 to 17, a rectangle-shaped, first communication cylinder (a first communication portion) 115 which communicates with the belt chamber 68 is projectingly formed in a top portion of the upper belt cover 11, and a urethane foam-made sealing member 117 is fitted on the upper periphery of the opening portion of the first communication cylinder 115. A rectangle-shaped, second communication cylinder (a second communication portion) 116 which extends vertically and abuts on the internal surface of the engine cover 4 at its upper end is formed in a right portion of the guide plate 75, and a notch 118 which communicates with the rear opening portion $4_1$ of the engine cover 4 via an up-facing step 72 is provided in the rear wall of the second communication cylinder 116. When the engine cover 4 is attached to the under case 3, the first and second communication cylinders 115 and 116 are joined to each other with the sealing member 117 interposed therebetween, and when the engine cover 4 is detached from the under case 3, the first and second communication cylinders 115 and 116 are separated from each other.

Air which is introduced into the belt chamber 68 via the opening portion $10_1$ and the slits $10_2$ passes through a ventilating communication passage 123 to be described later provided in the first communication cylinder 115, the second communication cylinder 116 and the notch 118, and is discharged from the rear opening portion $4_1$, whereby the ventilation of the belt chamber 68 can be effected. In this case, since the notch 118 of the second communication cylinder 116 occupies a position above the rear opening portion $4_1$, water droplets which reach the rear opening portion $4_1$ can be prevented from entering the second communication cylinder 116.

An intake silencer 76 is fixed to the front face of the crankcase 7 by three bolts 77. The intake silencer 76 includes a box-shaped body portion 78 and a duct portion 79 joined to the left side of the body portion 78. The duct portion 79 is, at its lower end, provided with an intake opening $79_1$ which faces downwardly, and is, at its upper end, provided with a communication port $79_2$ which communicates with the internal space of the body portion 78. A throttle body 80 is disposed on the right side of the body portion 78 of the intake silencer 76, and is connected to the body portion 78 via a short flexible intake duct 35.

The throttle body 80 is fixedly connected to an intake manifold 85 which will be described below. The intake manifold 85 is integrally provided with an elbow 81, a surge tank 82, four intake pipes 83a, 83b, 83c and 83d, and a mounting flange 84, and is so disposed as to extend along the right side of the engine E. The elbow 81 changes the flow of intake air by approximately 90° from a flow along the front side of the crankcase 7 to a flow along the right side of the crankcase 7, and may also be a flexible duct. In the present embodiment, the elbow 81 is integral with the surge tank 82, the intake pipes 83a, 83b, 83c and 83d, and the mounting flange 84 so that the throttle body 80 may be fixedly supported.

The connection portion between the elbow 81 and the surge tank 82 of the intake manifold 85 is formed to have a dimensional shape which is vertically smaller than the top and the bottom of the surge tank 82. This portion is fixed to the right wall of the crankcase 7 by bolts $86_1$ and $86_2$ and two brackets $86_3$ each having loose holes, and the mounting flange 84 is fixed to an intake manifold mounting surface 81 formed on the right side of the cylinder head 8 by a plurality of bolts 87.

The structure of a fuel supply system for the engine E will now be described with reference to FIGS. 2 to 8.

Figure 5:
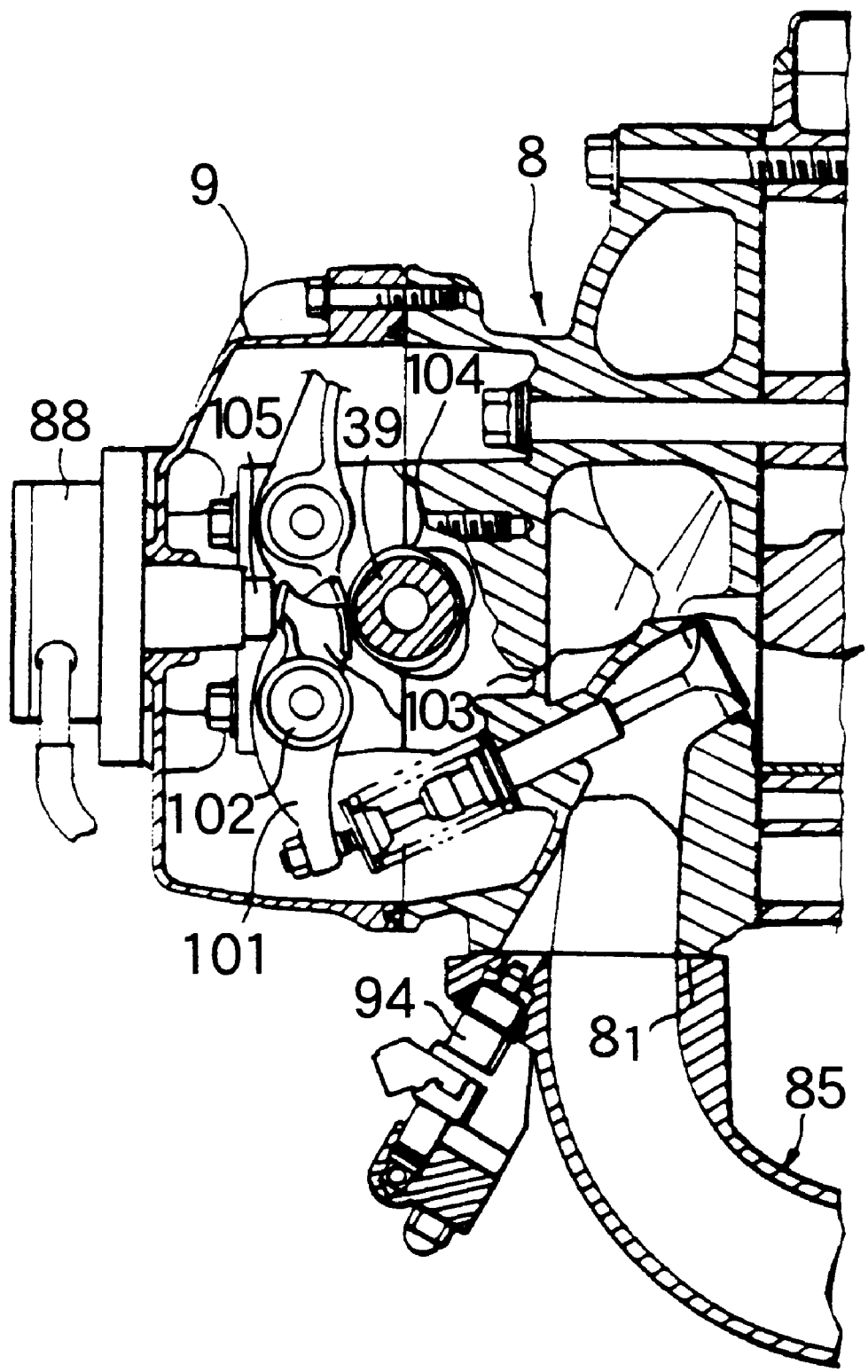
FIG. 5 is a cross-sectional view taken along a line 5—5 of FIG. 3.
Figure 6:
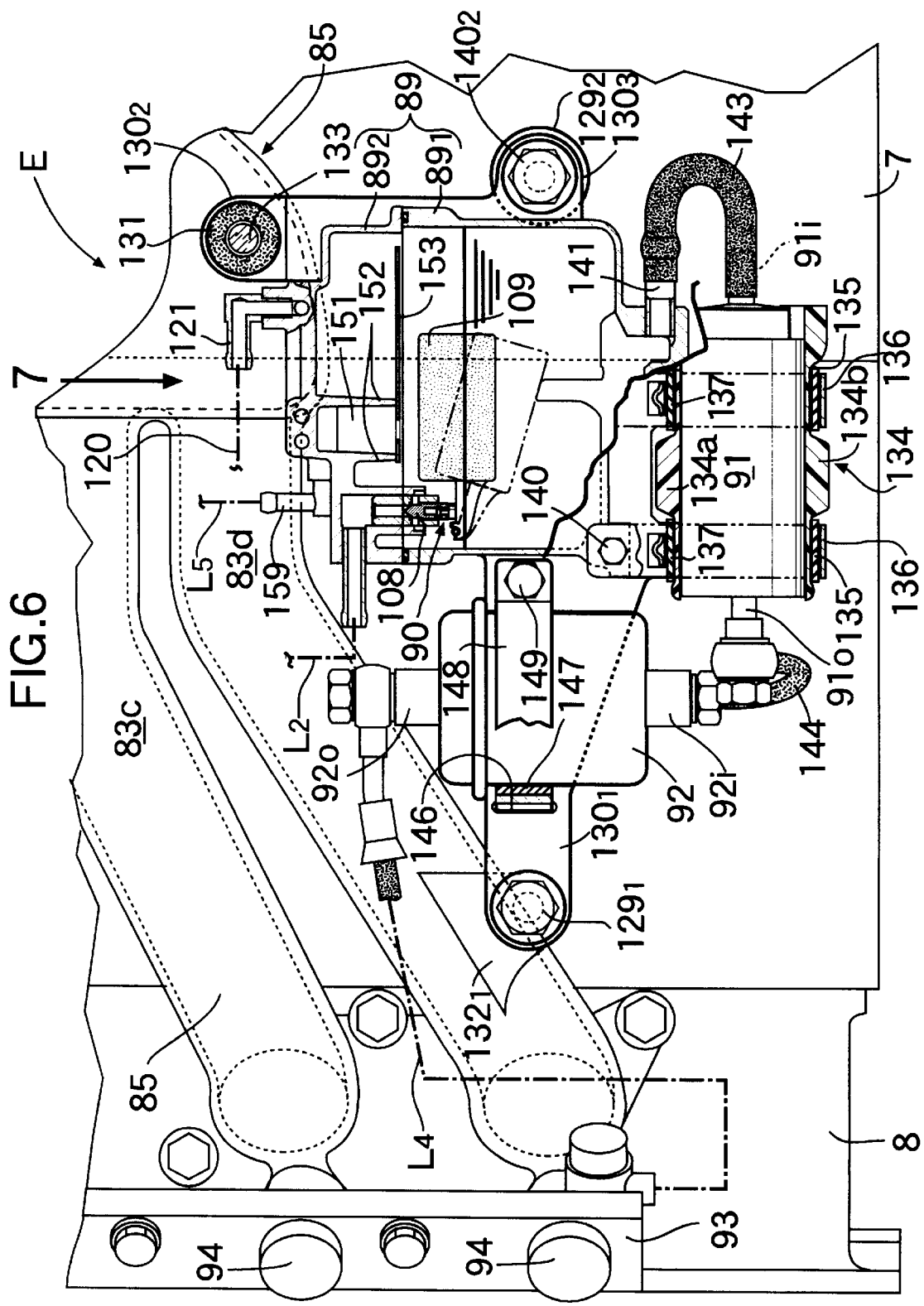
FIG. 6 is an enlarged cross-sectional view of elements shown in FIG. 3.

Two low-pressure fuel pumps 88, each of which is a plunger pump, are provided in parallel on the rear side of the head cover 9. Fuel sucked via a fuel supply pipe $L_1$ from a main fuel tank (not shown) which is installed in the boat is supplied via a fuel supply pipe $L_2$ to an auxiliary fuel tank 89 provided on the right side of the cylinder block 6 by the low-pressure fuel pumps 88. As shown in FIG. 5, a pump driving rocker arm 103 is coaxially supported by an intake rocker arm shaft 102 which supports an intake rocker arm 101, and one end of the pump driving rocker arm 103 is engaged with a pump cam 104 provided on the camshaft 39, while the other end is engaged with a plunger 105 of each of the low-pressure fuel pumps 88. Thus, the low-pressure fuel pumps 88 are driven by the camshaft 39.

As shown in FIGS. 6 to 12, the auxiliary fuel tank 89 is divided into a lower-side body portion 89, and an upper-side cap $89_2$ joined to the upper end of the lower-side body portion $89_1$, and the body portion $89_1$ is formed integrally with a first bracket $130_1$ which is elongated rearwardly, a second bracket $130_2$ which projects forwardly and is relatively short, and a third bracket $130_3$ which projects upwardly, and is also relatively short. Each elastic grommet 131 is fitted in the mounting hole formed in an extending end of each of these brackets $130_1$, $130_2$ and $130_3$. The first and second brackets $130_1$ and $130_2$ are secured via the corresponding grommets 131 to a first mounting boss $132_1$ formed on the fourth intake pipe 83d and a second mounting boss $132_2$ formed on the cylinder block 6 by bolts $129_1$ and $129_2$, respectively, and the third bracket 131 is also fixed to the cylinder block 6 by two bolts 107. A third bracket 131 is supported by a support pin 133 which projects from a side surface of the surge tank 82. The elastic grommets 131 can prevent transmission of vibrations from the engine E to the auxiliary fuel tank 89, and can also reduce conduction of heat.

A float valve 90 regulates the level of fuel stored in the auxiliary fuel tank 89, and is housed therein. Float valve 90 includes an opening/closing valve 108 which is provided in a portion where the fuel supply pipe $L_2$, extending from the low-pressure fuel pumps 88, is connected to the auxiliary fuel tank 89, and a float valve 109 which moves up and down according to the level of fuel to open or close the valve 108. When the fuel level falls below a prescribed level, the valve 108 opens to introduce fuel from the low-pressure fuel pumps 88 into the auxiliary fuel tank 89; and when the fuel level rises above the prescribed level, the opening/closing valve 108 closes to shut off the reception of fuel from the low-pressure fuel pumps 88.

A high-pressure fuel pump 91 and a high-pressure filter 92 are secured to the auxiliary fuel tank 89. The high-pressure fuel pump 91 is disposed immediately below the auxiliary fuel tank 89 and has an axis extending longitudinally. High-pressure filter 92 is disposed immediately behind the auxiliary fuel tank 89 and has an axis extending vertically.

The entire cylindrical periphery of the high-pressure fuel pump 91 is covered with a cylindrical heat insulator 234 comprising a pair of semi-cylinders 134*a* and 134*b* which are bolted together. In the illustrated example, the heat insulator 134 is prepared by forming a laminate of unwoven fabric and foamed melamine resin. A pair of front and rear annular grooves 135 are formed around the heat insulator 134 on both sides of a central thick portion, and rubber bands 137 are wound around the respective annular grooves 135. The high-pressure fuel pump 91 is tightly mounted on the outside surface of the bottom of the auxiliary fuel tank 89 by mounting bands 136 made of steel sheet which are respectively engaged with the peripheries of heating insulator 134. Specifically, a pair of front and rear hook engagement portions 138 are integrally formed on one side of a lower portion of the auxiliary fuel tank 89, while a pair of front and rear mounting bosses 139 are integrally formed on the other side of the lower portion. A hook 136*a* formed at one end of each of the mounting bands 136 is engaged with the corresponding one of the hook engagement portions 138, and the other end of each of the mounting bands 136 is fixed to the corresponding one of the mounting bosses 139 by a bolt 140, whereby the high-pressure fuel pump 91 is fastened to the outer surface of the bottom of the auxiliary fuel tank 89. Thus, the high-pressure fuel pump 91 is disposed immediately below the auxiliary fuel tank 89, whereby a fuel outlet pipe 141 which projects from the bottom front face of the auxiliary fuel tank 89 and a fuel inlet pipe 91*i* which projects from the front end face of the high-pressure fuel pump 91 are disposed close to each other, and pipes 141 and 91*i* are connected by low-pressure fuel pipe 143, which is configured to be as short as possible.

High-pressure filter 92 is mounted on the outside surface of the first bracket 130$_1$ of the auxiliary fuel tank 89. Specifically, a mounting boss 145 and a hook engagement portion 146 are respectively formed in front and rear portions of the first bracket 130$_1$. Hook 148*a* formed at one end of a steel-sheet-made mounting band 148, which is engaged with the periphery of the high-pressure filter 92 through a rubber band 147, is engaged with the hook engagement portion 146. The other end of the mounting band 148 is fixed to the mounting boss 145, whereby the high-pressure filter 92 is fastened to the outside surface of the first bracket 130$_1$ of the auxiliary fuel tank 89. Thus, a fuel outlet pipe 91*o* which projects from the rear end face of the high-pressure fuel pump 91 and a fuel inlet pipe 92*i* which projects from the lower end face of the high-pressure filter 92 are disposed close to each other, and these pipes 91*o* and 92*i* are connected by high-pressure fuel pipe 144, which is configured to be as short as possible.

Since the high-pressure fuel pump 91 is covered with the heat insulator 134, even if the temperature of the atmosphere in the engine cover 4 temporarily rises immediately after the operation of the engine E has stopped, the high-pressure fuel pump 91 can avoid being heated by the intense heat of the atmosphere, whereby bubbles can be effectively prevented from being formed in the fuel remaining in the high-pressure fuel pump 91 and the fuel can be optimally supplied to the injection valves 94 when engine E is restarted.

A fuel rail 93 is fixed to the mounting flange 84 of the intake manifold 85 by a plurality of bolts 113, and four injection valves 94 which correspond to the four cylinders 12 are fixed to the mounting flange 84. Fuel supplied from the high-pressure filter 92 to the lower end of the fuel rail 93 via a fuel supply pipe L$_4$ is distributed among the four injection valves 94. A regulator 95 provided at the upper end of the fuel rail 93 regulates the pressure of the fuel supplied to the injection valves 94, and returns extra fuel to the auxiliary fuel tank 89 via a fuel supply pipe L$_5$. The regulator 95 and the surge tank 82 are connected via a negative-pressure pipe L$_6$ so as to regulate the preset pressure of the regulator 95.

During the assembly of the engine E, in an auxiliary assembly line, high-pressure fuel pump 91 and the high-pressure filter 92 are previously mounted on the auxiliary fuel tank 89 to constitute an auxiliary fuel supply assembly, then the auxiliary fuel tank 89 is mounted on the intake manifold 85 to constitute an assembly of the manifold and the auxiliary fuel supply assembly, and, in a main assembly line, such an assembly is mounted on the body of the engine E. Thus, in the main assembly line, it is possible to reduce the number of assembling steps, thereby making the engine more efficient to assemble.

Figure 7:
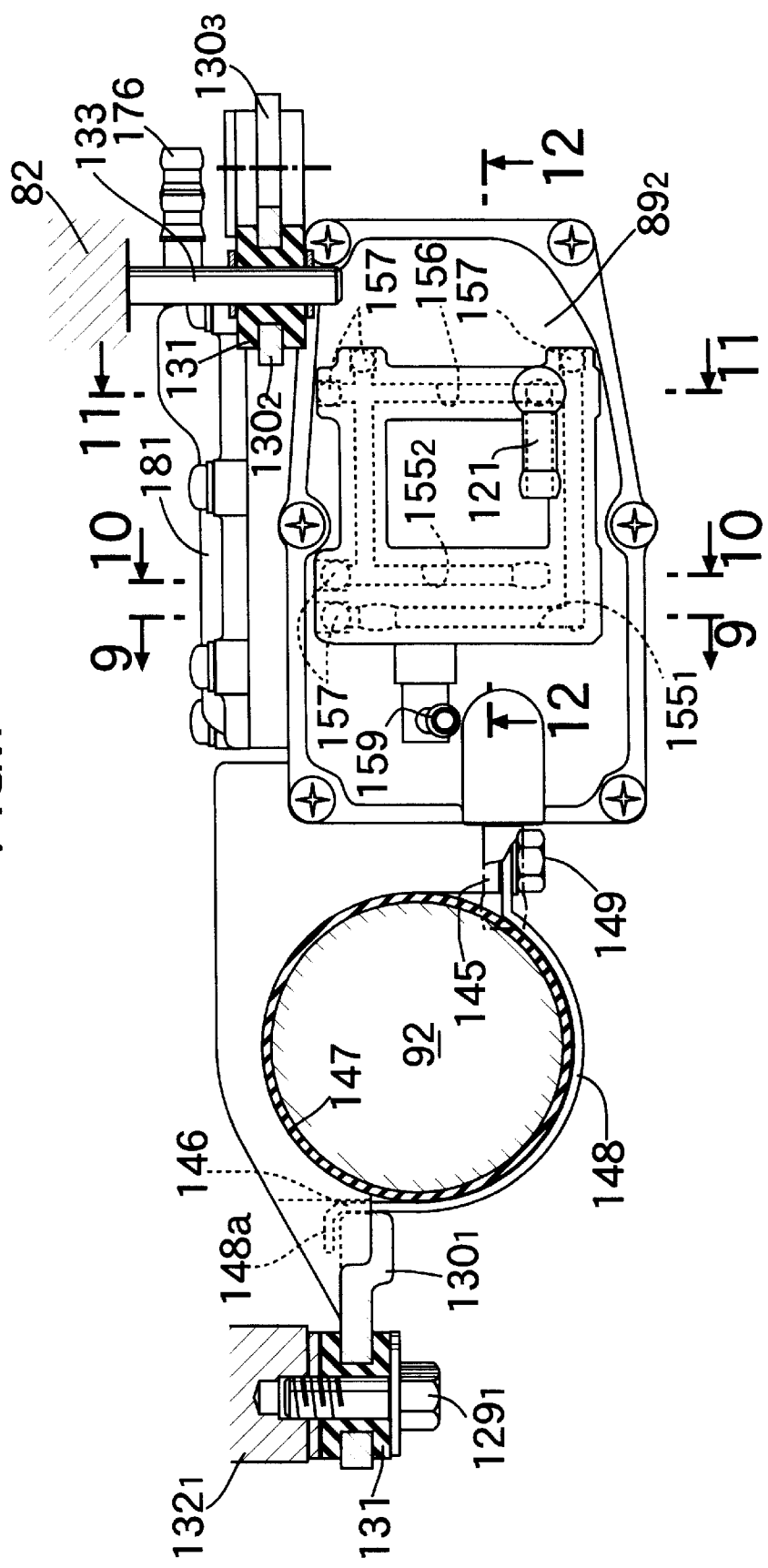
FIG. 7 is a view taken in the direction of an arrow 7 of FIG. 6.
Figure 8:
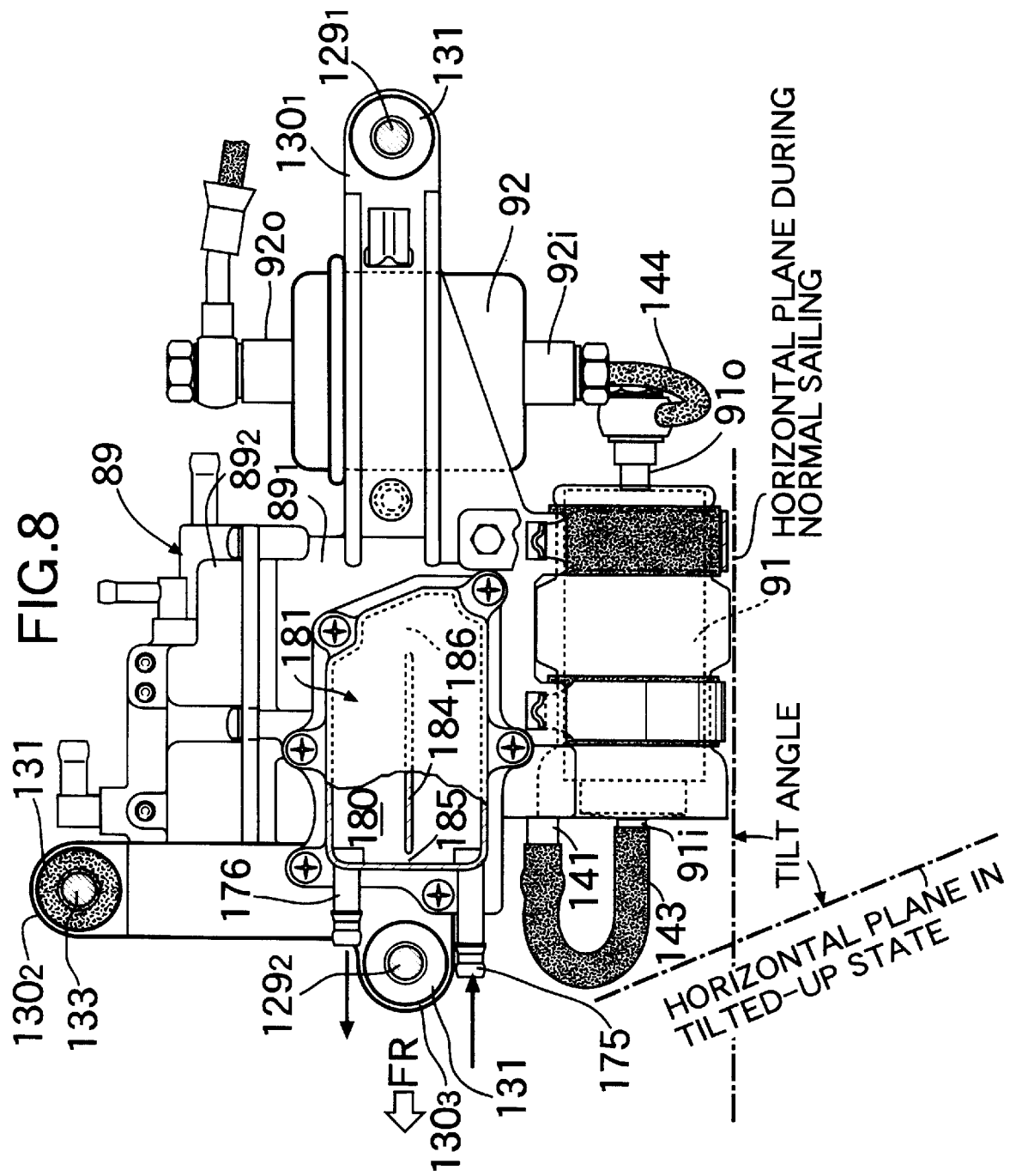
FIG. 8 is a view taken in the direction of an arrow 8 of FIG. 7.
Figure 9:
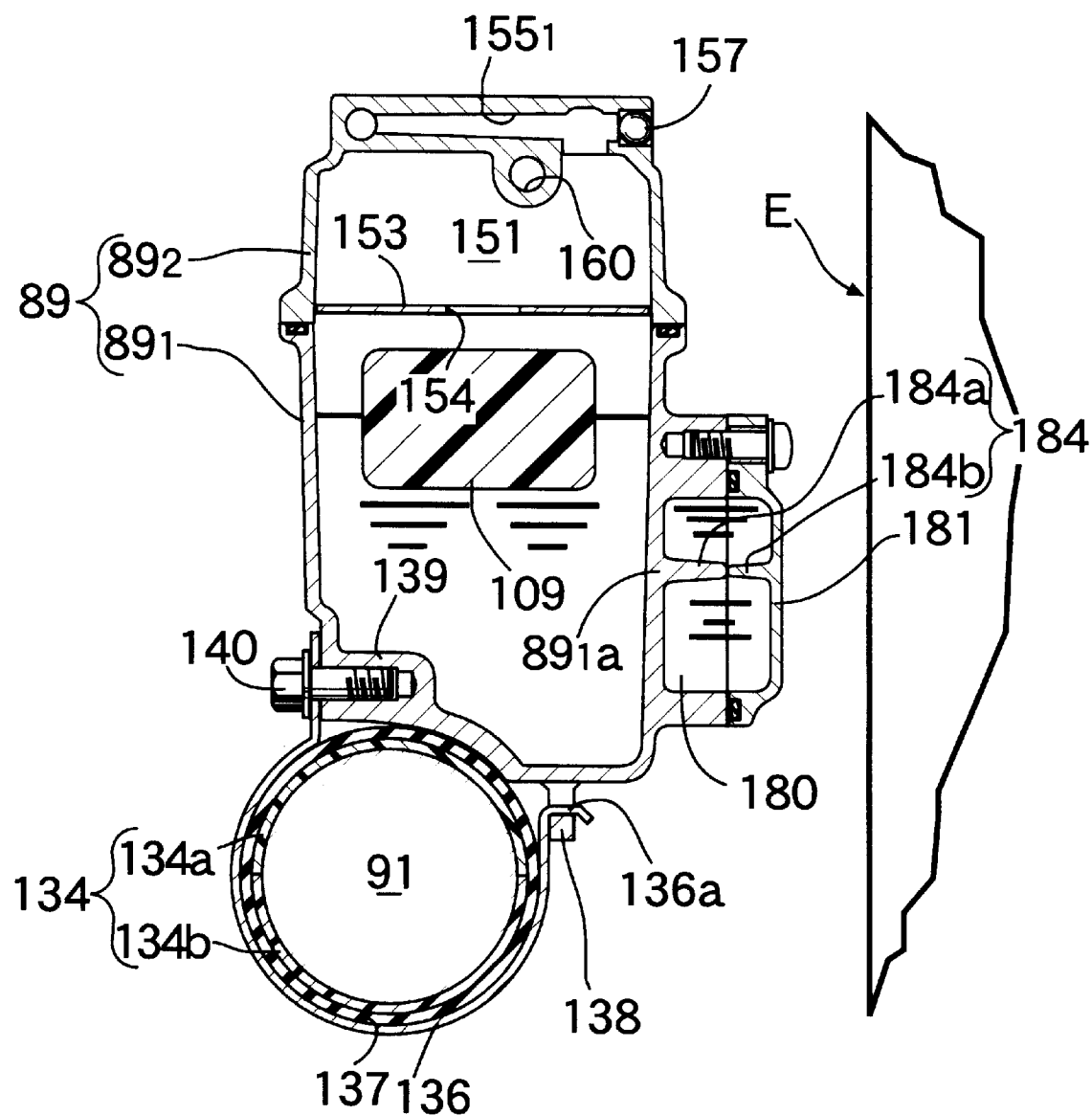
FIGS. 9, 10, 11 and 12 are cross-sectional views taken along a line 9—9 of FIG. 7, a line 10—10 of FIG. 7, a line 11—11 of FIG. 7 and a line 12—12 of FIG. 7, respectively.

As seen in FIGS. 7 to 9, an air vent chamber 151 is formed in an upper portion of the auxiliary fuel tank 89. This air vent chamber 151 is defined by a pair of partitioning walls 152 which project from the ceiling of the upper-side cap 89$_2$ and are longitudinally spaced apart from each other, and a baffle plate 153 which is joined to the lower end faces of both partitioning walls 152. A through-hole 154, for communication of the central portion of the air vent chamber 151, with a space below the air vent chamber 151 is formed in the baffle plate 153. A pair of first and second air vent holes 155$_1$ and 155$_2$ are opened in the ceiling of the air vent chamber 151. The open ends of the respective air vent holes 155$_1$ and 155$_2$ are laterally separated from each other as widely as possible. The first and second air vent holes 155$_1$ and 155$_2$ are so disposed as to occupy positions which are slightly offset from the longitudinal center of the auxiliary fuel tank 89 toward the rear. Both air vent holes 155$_1$ and 155$_2$ communicate with each other via a confluence air vent hole 156 which is longitudinally separated from the air vent chamber 151. These first and second air vent holes 155$_1$ and 155$_2$ and the confluence air vent hole 156 are drilled in the ceiling wall of the upper-side cap 89$_2$, and the respective drilled holes are closed by blank plugs 157.

A coupler 121 which communicates with the confluence air vent hole 156 is provided on the top of the upper-side cap 89$_2$. Coupler 121 is connected to a coupler 122 which projects from the lower side of the lower belt cover 10 via an air vent pipe 120.

Referring again to FIGS. 14 to 17, the upper and lower belt covers 11 and 10 are formed with a partitioning wall 125 which partitions the first communication cylinder 115 into the ventilating communication passage 123 which communicates with the belt chamber 68 and an air vent communication passage 124 which communicates with the coupler 122.

Ventilation can be effected between the auxiliary fuel tank 89 and the rear opening portion 4$_1$ through an air vent passage constituted of the through-hole 154 of the baffle plate 153, the air vent chamber 151, the first and second air vent holes 155$_1$ and 155$_2$, the confluence air vent hole 156, the air vent pipe 120, the air vent communication passage 124 and the second communication cylinder 116 according to the change in amount of the fuel stored in the auxiliary fuel tank 89. Accordingly, the interior of the auxiliary fuel tank 89 can be maintained at approximately atmospheric pressure at all times, and fuel can be smoothly supplied to the injection valves 94. If fuel vapors in the auxiliary fuel tank 89 caused by, for example, the auxiliary fuel tank 89 being exposed to heat radiated from the engine E or high-temperature extra fuel returns from the regulator 95 to the auxiliary fuel tank 89, the fuel vapor ascends in the air vent passage and is smoothly discharged through the notch 118 of the second communication cylinder 116 and the rear opening portion $4_1$ of the upper portion of the engine cover 4. Thus, the fuel vapor is prevented from being sucked into the engine E, so that degradation of the exhaust characteristics of the engine E can be avoided. In addition, since the air vent communication passage 124 through which the fuel vapor passes is isolated from the ventilating communication passage 123 in the first communication cylinder 115 by the partitioning wall 125, the fuel vapor can also be prevented from flowing into the belt chamber 68.

Furthermore, since the ventilating communication passage 123 and the air vent communication passage 124 are formed in the common first communication cylinder 115, and these passages 123 and 124 come into communication with the second communication cylinder 116 simultaneously when the engine cover 4 is mounted, only one communication portion is needed and only one sealing member 117 is needed to seal the communication portion, whereby the entire structure can be simplified.

When the outboard motor is attached to a moored or anchored boat, if the outboard motor O is tilted up and turned in either of the rightward and leftward directions, or if the outboard motor O is detached from the boat and laid on its side, the level of the fuel remaining in the auxiliary fuel tank 89 changes in a direction perpendicular to the direction of the normal state, but even if either of the open ends of the first and second air vent holes $155_1$ and $155_2$ is immersed in the fuel, the other is always exposed above the level of the fuel. Accordingly, the interior of the auxiliary fuel tank 89 can continue to be ventilated through the air vent hole $155_1$ or $155_2$ having the open end exposed above the level of the fuel, the above-described air vent passage, and the rear opening portion $4_1$ which communicate with the air vent passage $155_1$ or $155_2$, and the outflow of the fuel from the auxiliary fuel tank 89 can be prevented. This means that even when the boat inclines toward the right or left during operation, the interior of the auxiliary fuel tank 89 can ventilate smoothly.

In addition, since the open ends of the first and second air vent holes $155_1$ and $155_2$ are disposed at positions which are slightly offset from the longitudinal center of the auxiliary fuel tank 89 toward the rear, even if the outboard motor O is tilted up for any reason during operation such as through shallow water, the open ends of the air vent passages $155_1$ and $155_2$ are not immersed in the fuel. Accordingly, the ventilation of the interior of the auxiliary fuel tank 89 can be ensured.

Furthermore, since the open ends of the first and second air vent passages $155_1$ and $155_2$ are covered with the baffle plate 153 in the air vent chamber 151, even if the fuel in auxiliary fuel tank 89 sloshes or ripples, the fuel can be prevented from entering the first and second air vent holes $155_1$ and $155_2$, by the baffle plate 153.

Figure 12:
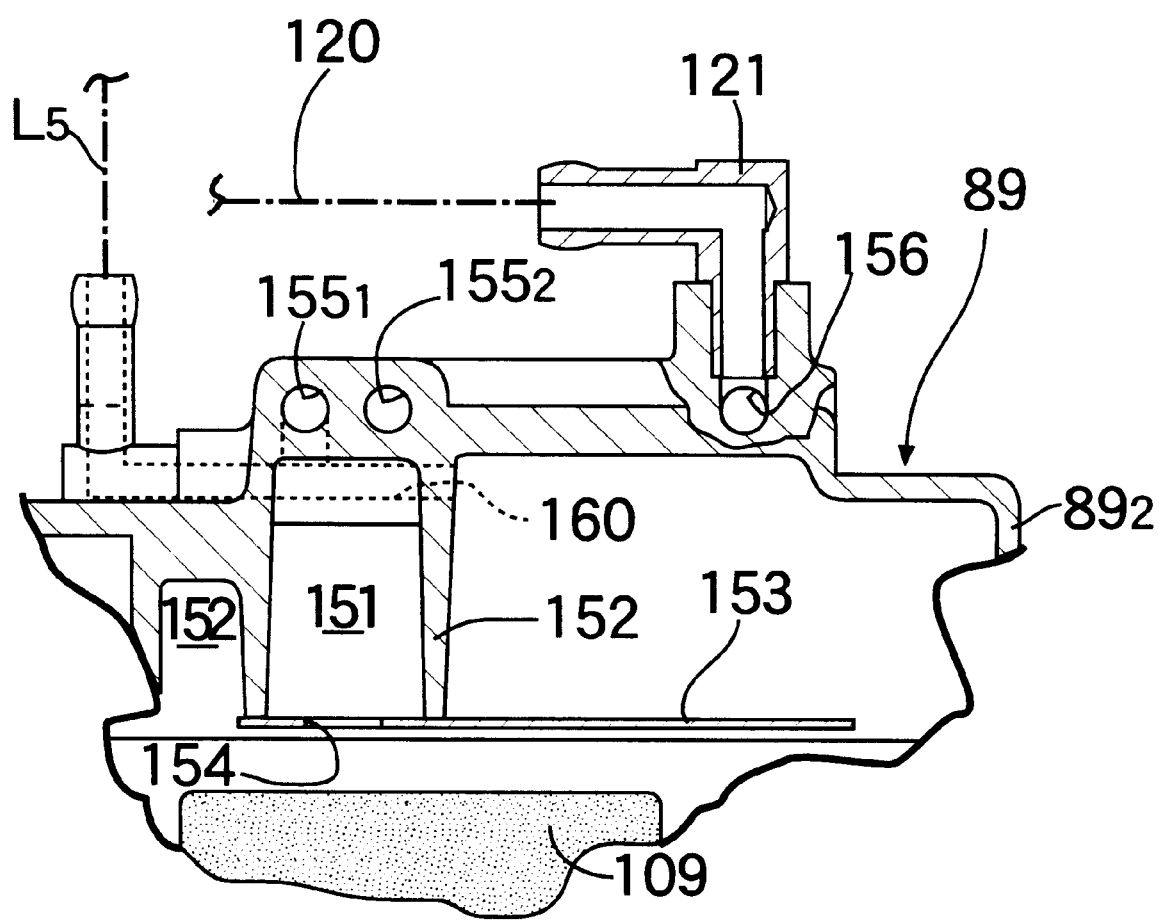
Figure 13:
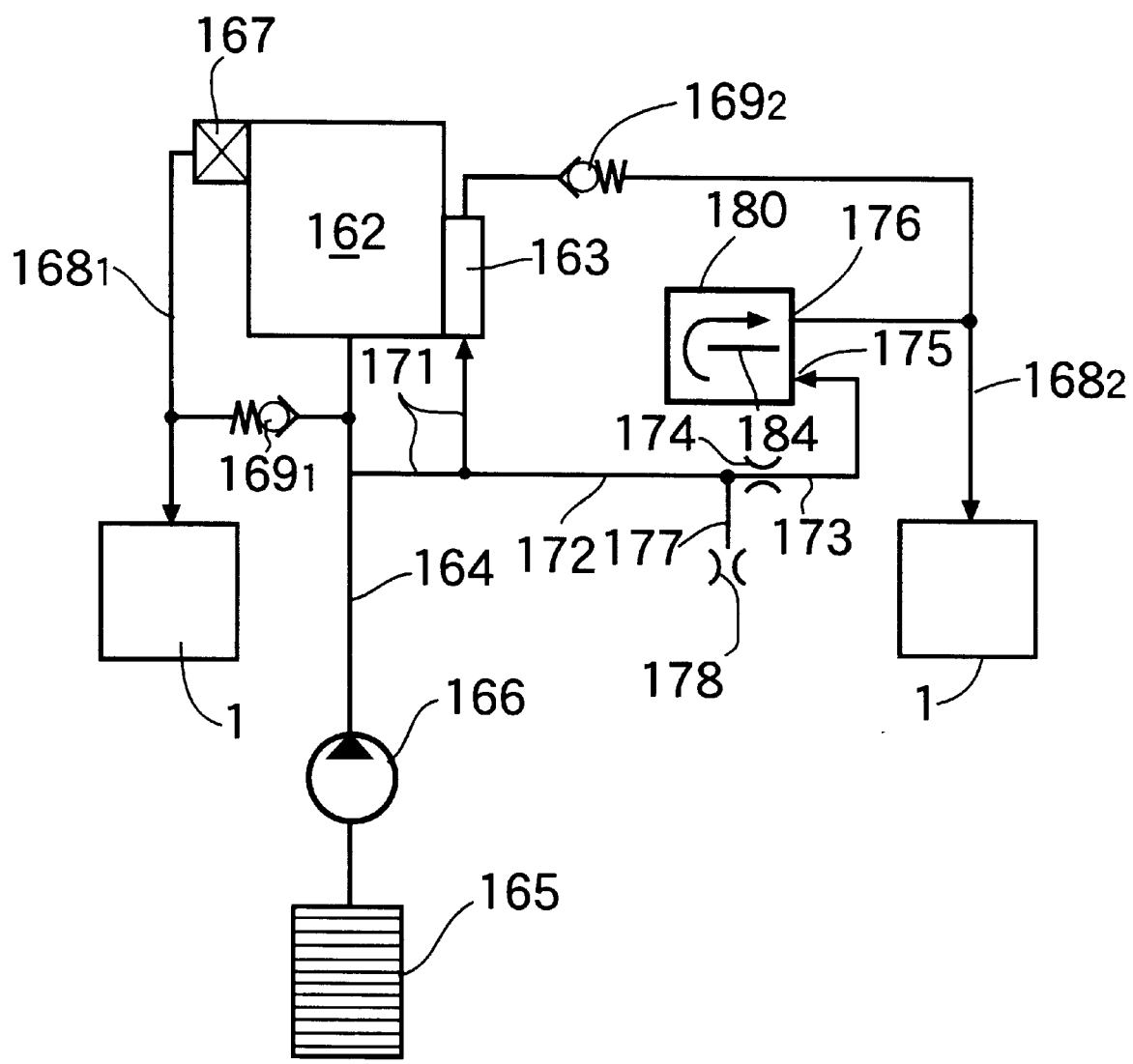
FIG. 13 is a diagram showing a cooling-water circuit.
Figure 14:
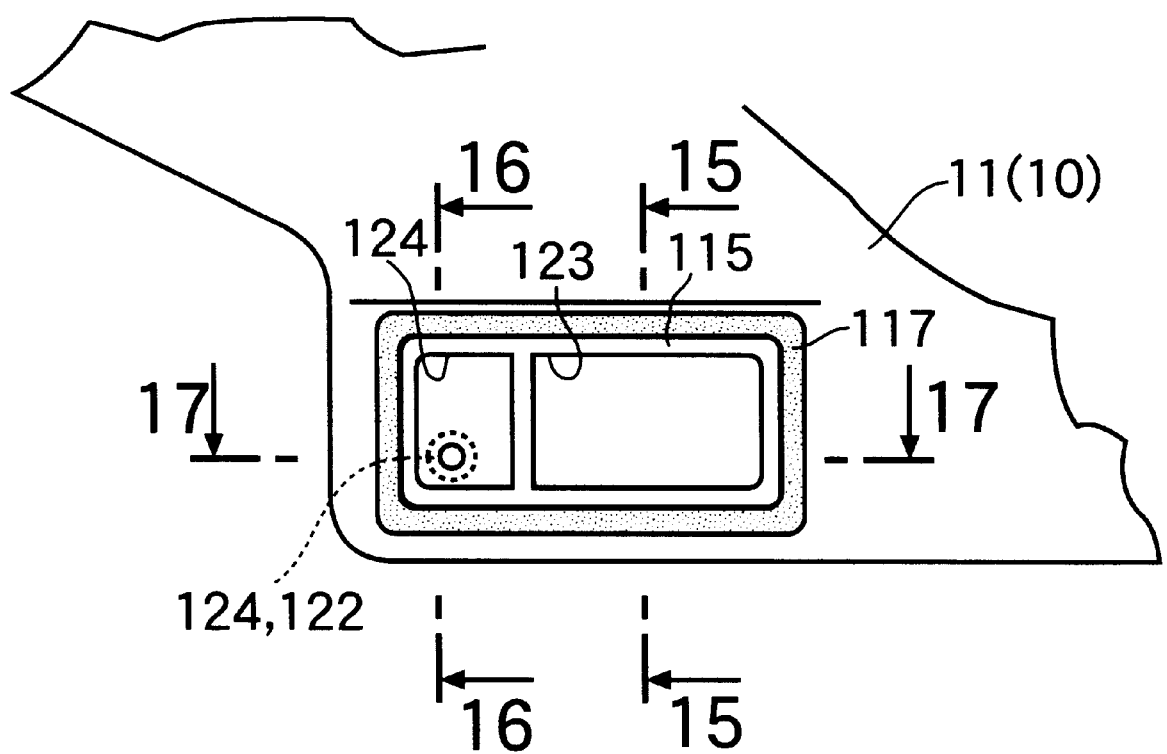
FIG. 14 is a view taken in the direction of an arrow 14 of FIG. 3.
Figure 15:
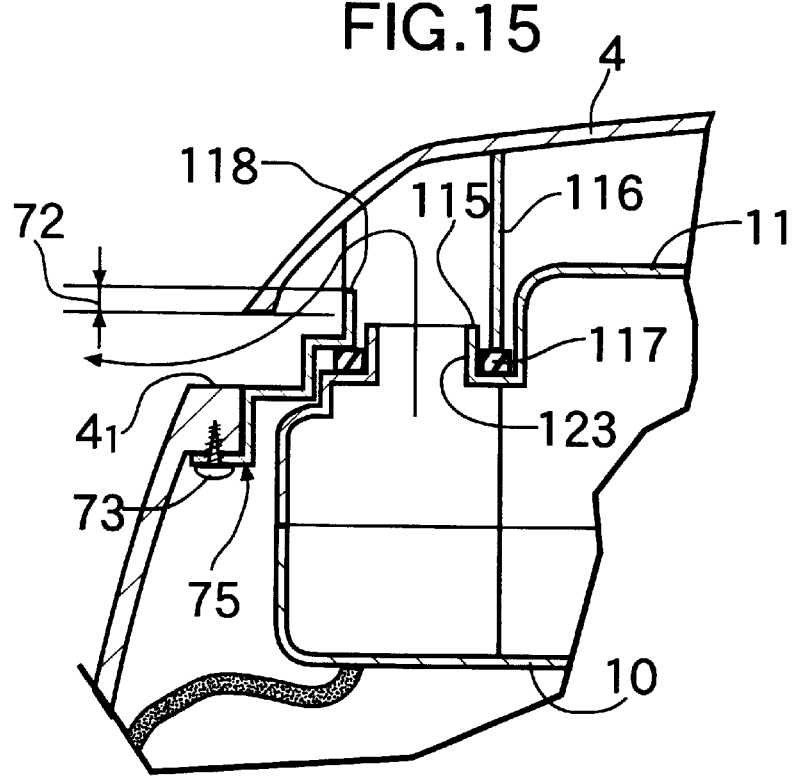
FIGS. 15, 16 and 17 are cross-sectional views taken along a line 15—15 of FIG. 14, a line 16—16 of FIG. 14 and a line 17—17 of FIG. 14, respectively.
Figure 16:
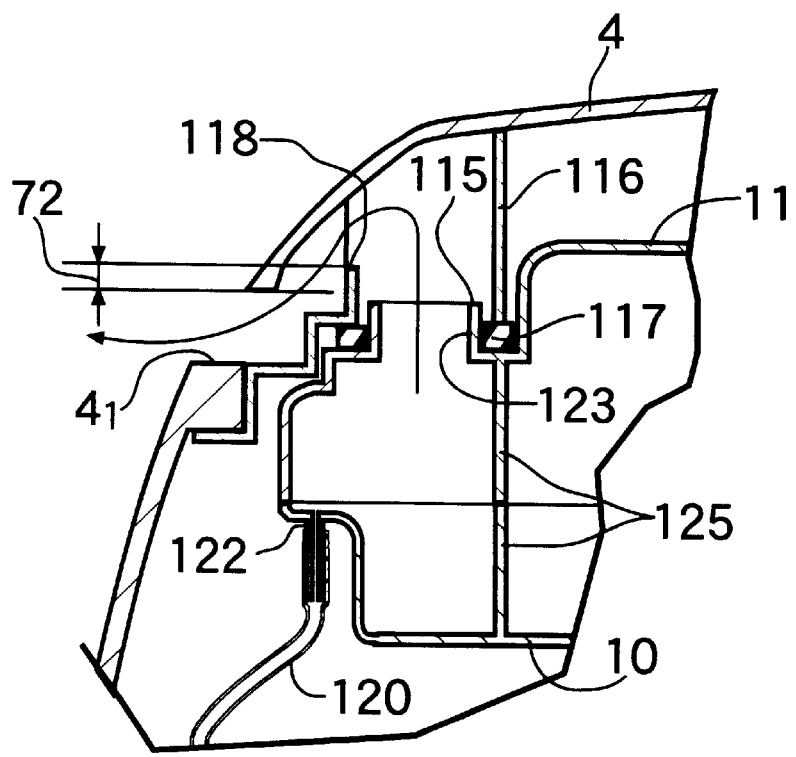
Figure 17:
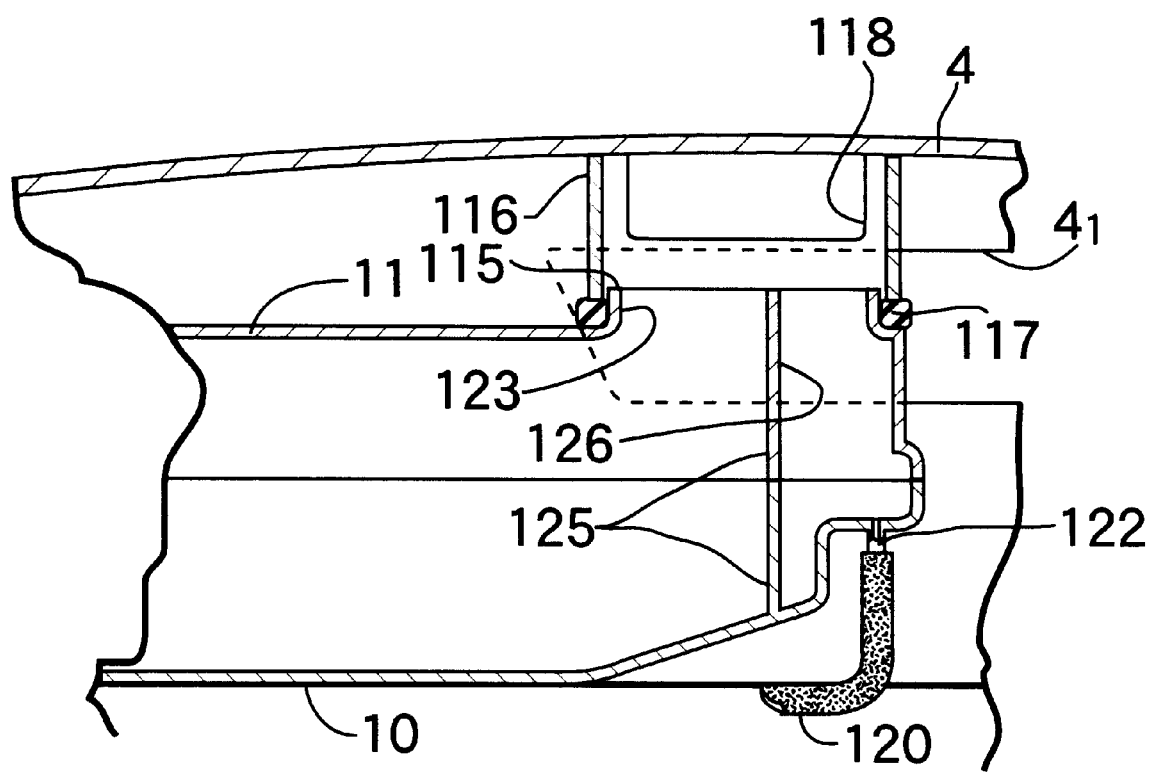

As shown in FIGS. 7 and 12, the ceiling wall of the upper-side cap $89_2$ is provided with a coupler 159 to which the fuel supply pipe $L_5$ is connected, and a fuel return hole 160 which communicates with the coupler 159. The fuel return hole 160 is provided so as to open in the front face of the front partitioning wall 152 of the air vent chamber 151. Baffle plate 153 is formed so as to project forwardly from the front partitioning wall 152. Accordingly, since high-temperature and high-pressure extra fuel which has passed through the fuel supply pipe $L_5$ is discharged onto the baffle plate 153 in the auxiliary fuel tank 89 from the fuel return hole 160, the bubbles contained in the fuel are separated on the baffle plate 153, whereby mixture of bubbles with the fuel stored in the auxiliary fuel tank 89 can be avoided as completely as possible. In addition, since the returned fuel is prevented from falling onto the float 109, malfunction of the float valve 90 can also be prevented.

A cooling apparatus for the engine E and the auxiliary fuel tank 89 will now be described with reference to FIGS. 3, 8, 10 and 13.

The engine E is provided with a main water jacket 162 for cooling the cylinder block 6 and the cylinder head 8, and a subsidiary water jacket 163 for cooling a lubricating oil gallery. The auxiliary fuel tank 89 is provided with a water jacket 180 for cooling the auxiliary fuel tank 89. The inlet of the main water jacket 162 communicates with an intake port 165 (refer to FIG. 1) of the extension case 1 via a main water passage 164, and a water pump 166 driven by the drive shaft 17 is inserted in the main water passage 164. A first discharge passage $168_1$ is connected to the outlet of the main water jacket 162 via a thermal valve or thermostat 167, and the downstream end of the first discharge passage $168_1$ is opened in the extension case 1. The inlet of the main water jacket 162 and the first discharge passage $168_1$ are connected via a water bypass 170 having a first relief valve $169_1$. First relief valve $169_1$ is adapted to open when the water pressure of the main water passage 164 is not below a prescribed value.

A first branch water passage 171 is connected to an intermediate point of the main water passage 164, and is connected to the inlet of the subsidiary water jacket 163. A second discharge passage $168_2$ which opens in the extension case 1 at its downstream end is connected to the outlet of the subsidiary water jacket 163, and the second discharge passage $168_2$ is provided with a second relief valve $169_2$ which opens when the water pressure of the subsidiary water jacket 163 is not less than a prescribed value. The valve opening pressure of the second relief valve $169_2$ is set to be lower than that of the first relief valve $169_1$.

A second branch water passage 172 is connected to the first branch water passage 171, and also connected to an inlet pipe 175 of the water jacket 180 of the auxiliary fuel tank 89, and an orifice 174 is provided at an intermediate point of the second branch water passage 172. An outlet pipe 176 of the water jacket 180 is connected to the second discharge passage $168_2$. Further, a water measuring passage 177 communicates with a water measuring hole 178 which opens in the outside face of the under case 3, and is connected to the second branch water passage 172 on the upstream side of the orifice 174. The water measuring passage 177 is positioned below the water jacket 180 of the auxiliary fuel tank 89 even when the outboard motor O is in its tilted-up state, and the outlet of the water measuring passage 177, i.e., the water measuring hole 178, is so provided as to open in the outside face of the outboard motor O which faces down when the outboard motor O is in the tilted-up state.

During operation of engine E, the water pump 166 driven by the drive shaft 17 is supplies cooling water pumped up from the intake port 165, to the main water passage 164, the first branch water passage 171, the second branch water passage 172 and a third branch water passage 173. During the warm-up of the engine E during which the thermal valve 167 is closed, the cooling water supplied to the main water passage 164 presses and opens the first relief valve 169, and flows into the water bypass 170 to promote the warm-up of the engine E. After warm-up, when the thermal valve 167 opens, the first relief valve $169_1$ is closed and the cooling water starts to circulate through the main water jacket 162, whereby the engine E can be cooled.

The cooling water supplied to the first branch water passage 171 circulates at all times through the subsidiary water jacket 163 while pressing and opening the second relief valve $169_2$, and cools the lubricating oil gallery, irrespective of whether the engine E is cold-started or started in a warmed-up condition. Incidentally, since the valve opening pressure of the second relief valve $169_2$ is set to be comparatively low, even if the water pressure of the subsidiary water jacket 163 lowers as a result of the opening of the thermal valve 167, the second relief valve $169_2$ can continue to open.

Part of the cooling water supplied to the second and third branch water passages 172 and 173 at all times circulates through the water jacket 180 of the auxiliary fuel tank 89 and cools the auxiliary fuel tank 89, irrespective of whether the engine E is cold-started or warmed-up. The remaining part of the cooling water is discharged through the water measuring passage 177 and the water measuring hole 178.

The cooling water which has passed through the water bypass 170 and each of the water jackets 162, 163 and 180 is discharged into the extension case 1 through the first discharge passage $168_1$ or the second discharge passage $168_2$, and is discharged underwater through a hollow portion of the boss of the propeller 20 together with the exhaust gas of the engine E.

Figure 10:
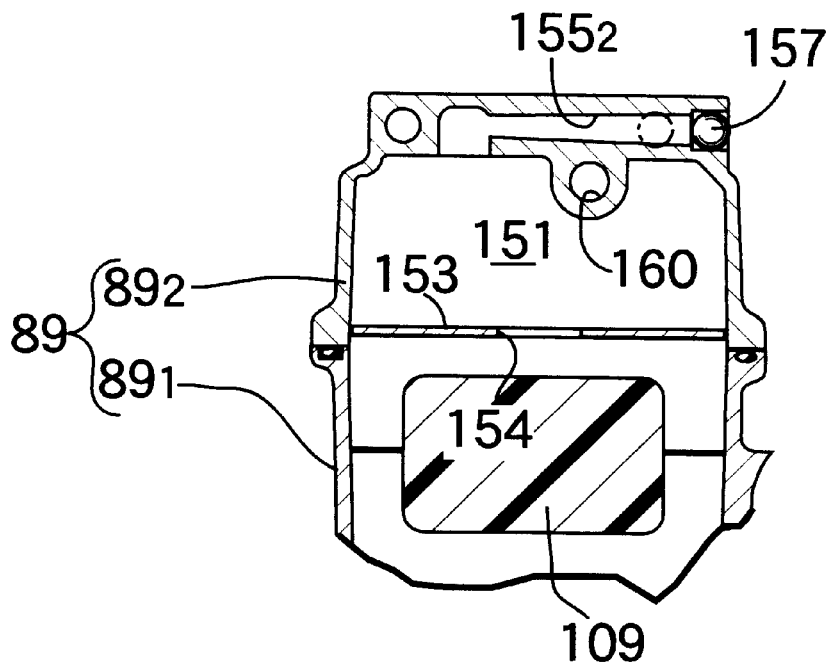
Figure 11:
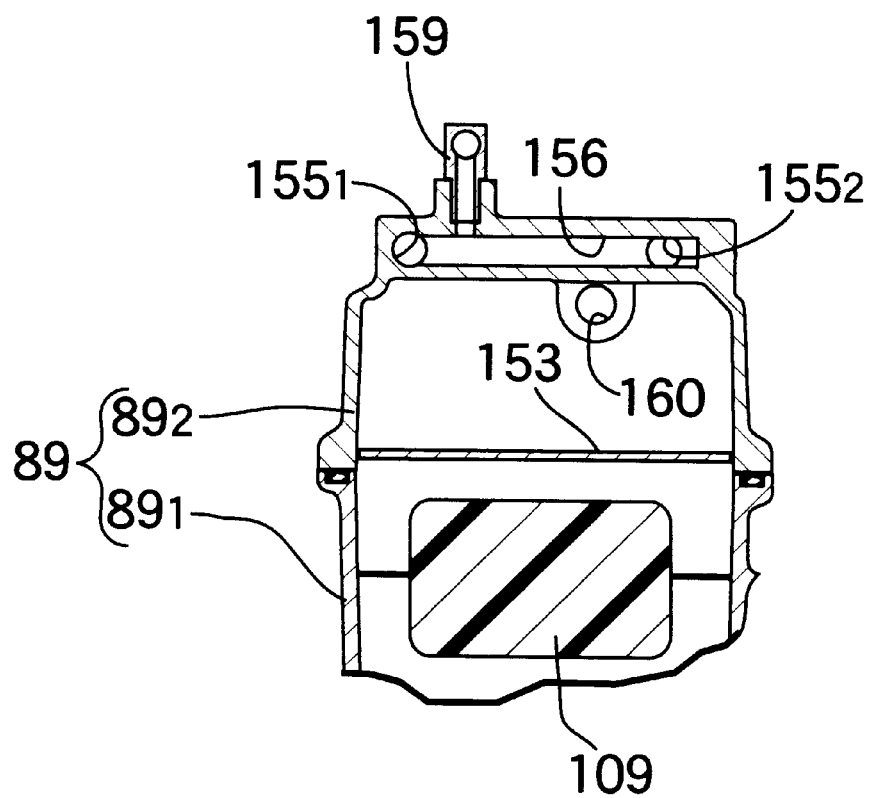

As shown in FIGS. 8 and 10, the water jacket 180 is defined between a side wall $89_{1a}$ of the tank body $89_1$ of the auxiliary fuel tank 89 which is adjacent to the engine E and a side cap 181 joined to the side wall $89_{1a}$. This water jacket 180 is formed to extend longitudinally, and an inlet pipe 175 and an outlet pipe 176 are respectively secured to lower and upper portions of the front end wall of the water jacket 180. The third branch water passage 173 is connected to the inlet pipe 175, while the second discharge passage $168_2$ is connected to the outlet pipe 176. A water flow guide plate 184 extends horizontally in the longitudinal direction in an intermediate portion between the inlet pipe 175 and the outlet pipe 176, and is disposed in the water jacket 180. The water flow guide plate 184 is made up of a pair of left and right ribs 184a and 184b which are integrally formed on the opposed faces of the side wall $89_{1a}$ and the side cap 181, and a small clearance 185 is provided between the water flow guide plate 184 and the front end wall of the water jacket 180, while a large clearance 186 is provided between the water flow guide plate 184 and the rear end wall of the water jacket 180.

Accordingly, during the operation of the engine E, most part of the cooling water which has flown into the water jacket 180 through the inlet pipe 175 and the third branch water passage 173 circulates around the water flow guide plate 184 while passing through the large clearance 186. In other words, the water smoothly circulates through the entire water jacket 180, and can efficiently cool the auxiliary fuel tank 89. It is therefore possible to effectively cool the fuel in the auxiliary fuel tank 89 and to inhibit the fuel from vaporizing. The cooling water which has passed through the water jacket 180 flows into the second discharge passage $168_2$ through the outlet pipe 176.

When engine E is stopped, the operation of the water pump 166 also stops, so that the cooling water in the main water jacket 162 and the subsidiary water jacket 163 of the engine E mainly flow down the main water passage 164 and can flow out through the intake port 165. The cooling water in the water jacket 180 of the auxiliary fuel tank 89 flows down the inlet pipe 175, the third branch water passage 173 and the water measuring passage 177 and can flow out through the water measuring hole 178.

In this case, since the inlet pipe 175 is provided in the lower portion of the front end wall of the water jacket 180 of the auxiliary fuel tank 89, even if the outboard motor O is tilted-up, the front end wall of the water jacket 180 is located below the rear end wall thereof, the inlet pipe 175 is located at approximately the lowest position, and, in addition, water on the upper side of the water flow guide plate 184 can flow into the inlet pipe 175 through the small clearance 185. Furthermore, since the water measuring passage 177 is located below inlet pipe 175, the cooling water in the water jacket 180 can completely flow out into the water measuring passage 177 through inlet pipe 175. In addition, since the water measuring hole 178 is opened in the outside face of the outboard motor O which faces downwardly when the outboard motor O is in the tilted-up state, it is possible to reliably discharge the cooling water in the water jacket 180 to the outside without allowing the cooling water to remain in the water measuring passage 177. Thus, by discharging the remaining water from each of the water jackets 162, 163 and 180, it is possible to prevent the occurrence of rust and corrosion of the internal surfaces of the water jackets 162, 163 and 180, the water measuring passage 177 and the like due to the remaining water, and it is also possible to prevent the various components and passages from being damaged by the freezing of remaining water.

Figure 18:
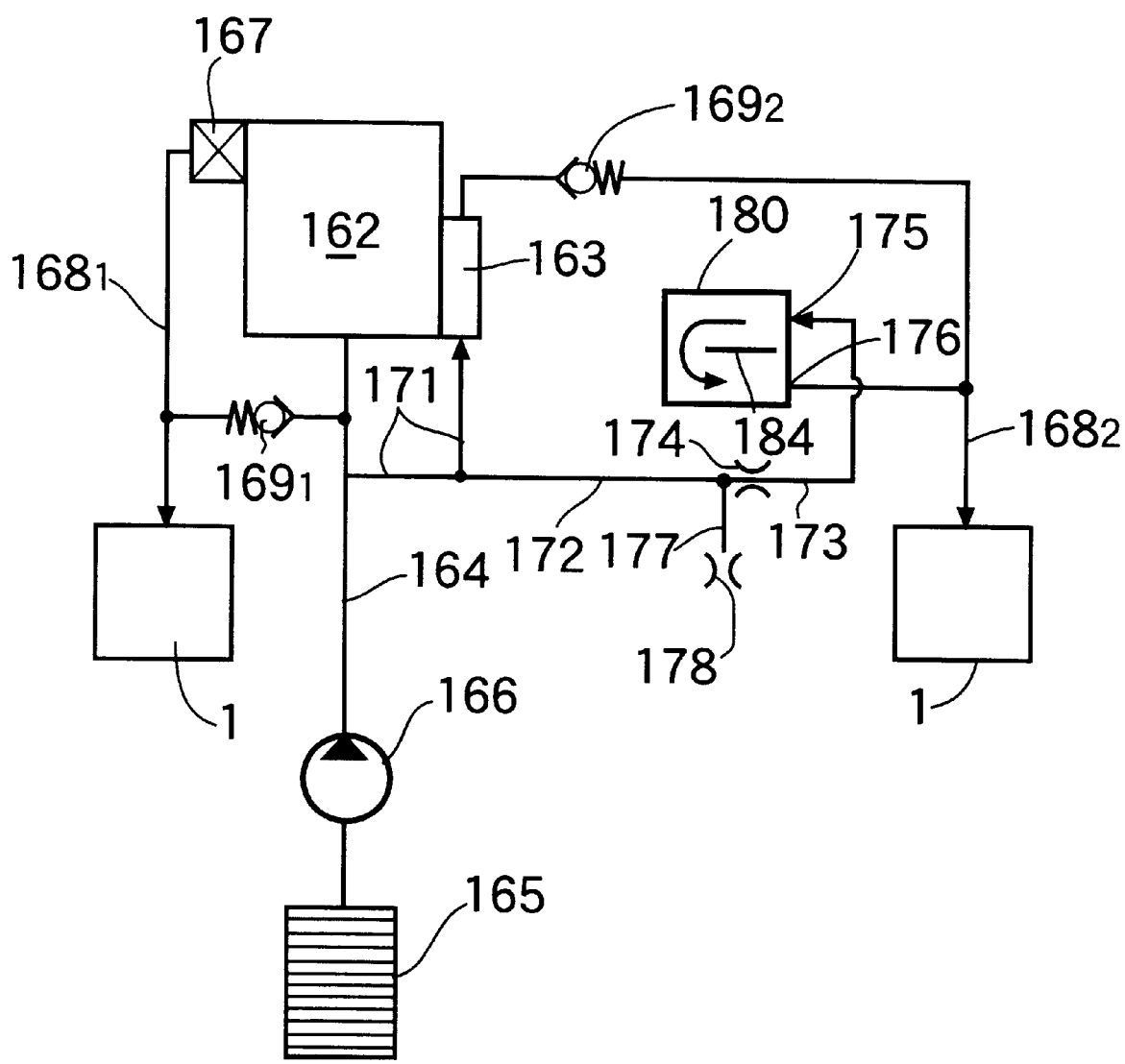
FIG. 18 is a diagram showing a cooling-water circuit of a second embodiment of the present invention.

FIG. 18 illustrates a second embodiment of the present invention. In the second embodiment, the inlet pipe 175 and the outlet pipe 176 are respectively provided in the upper and lower portion of the front end wall of the water jacket 180 of the auxiliary fuel tank 89, whereas the outlet pipe 176 is connected to the second discharge passage $168_2$ in a portion which is located below the outlet pipe 176 when the outboard motor O is in the tilted-up state. Since the second embodiment is similar in construction to the first embodiment except for the above feature, identical reference numerals denote portions corresponding to those of the first embodiment, and the description thereof will be omitted.

In the second embodiment, since the outlet pipe 176 is located at approximately the lowest position of the water jacket 180 when the outboard motor O is tilted up, the cooling water in the water jacket 180 flows out from the outlet pipe 176 toward the second discharge passage $168_2$ similarly to the case where the engine E is operating, so that no cooling water remains in the water jacket 180.

Although the embodiments of the present invention have been described above in detail, various design changes can be made without departing from the scope and spirit of the present invention. For a proper understanding of the metes and bounds of the present invention, reference should be made to the appended claims.

We claim:

1. An outboard motor, said outboard motor comprising:
   an engine, said engine configured to be tiltable from a first position which is an operating position to a second position which is a tilted-up position;
   drive means connected to said engine for driving a propeller, wherein when said engine is in said second position said drive means is tilted upward;
   an auxiliary fuel tank connected to said engine for storing fuel returning from a fuel injection valve side of the engine;

a high-pressure fuel pump connected to said engine and said auxiliary fuel tank for pumping fuel from said auxiliary fuel tank to the fuel injection valve side of the engine;

a water jacket connected to said auxiliary fuel tank for cooling the fuel which is stored in the auxiliary fuel tank;

a water pump driven by said engine to supply water from an external water source to an inlet of said water jacket, wherein a first discharged passage is connected to an outlet of said water jacket;

an engine cover which covers the engine, the fuel pump, and the auxiliary fuel tank, wherein the inlet of said water jacket is configured at a lowest portion of said water jacket when the engine is in the second position; said outboard motor further comprising a second discharge passage attached to said water jacket, said second discharge passage being connected to said inlet and being configured to be below the inlet when the engine is in the second position.

2. An outboard motor as recited in claim 1, wherein said second discharge passage comprises a water measuring passage, and includes an opening in an outside face of the outboard motor.

3. An outboard motor as recited in claim 2, wherein the opening of the water measuring passage in the outside face of the outboard motor is opened downwardly when the engine is in the second position.

4. An outboard motor, said outboard motor comprising:

an engine, said engine configured to be tiltable from a first position which is an operating position to a second position which is a tilted-up position;

drive means connected to said engine for driving a propeller, wherein when said engine is in said second position said drive means is tilted upward;

an auxiliary fuel tank connected to said engine for storing fuel returning from a fuel injection valve side of the engine;

a high-pressure fuel pump connected to said engine and said auxiliary fuel tank for pumping fuel from said auxiliary fuel tank to the fuel injection valve side of the engine;

a water jacket connected to said auxiliary fuel tank for cooling the fuel which is stored in the auxiliary fuel tank;

a water pump driven by said engine to supply water from an external water source to an inlet of said water jacket, wherein a discharge passage is connected to an outlet of said water jacket;

an engine cover which covers the engine, the fuel pump, and the auxiliary fuel tank, wherein the inlet of said water jacket is configured at a lowest portion of said water jacket when the engine is in the second position, and wherein said outlet of said water jacket is connected to said discharge passage at a position which is located below said outlet when said engine is in the second position.

5. An outboard motor as recited in claim 4, wherein the discharge passage includes a water measuring passage, and also includes an opening in an outside face of the outboard motor.

6. An outboard motor as recited in claim 5, wherein the opening of the water measuring passage in the outside face of the outboard motor is opened downwardly when the engine is in the second position.

7. An outboard motor, said outboard motor comprising:

engine means for providing a rotating force for driving a propeller, said engine means configured to be tiltable from a first position which is an operating position to a second position which is a tilted-up position;

drive means connected to said engine means for driving the propeller, wherein when said engine means is in a second position, said drive means is tilted upward;

auxiliary fuel tank means connected to said engine means for storing fuel returning from a fuel injection valve side of the engine means;

high pressure fuel pump means connected to said engine means and said auxiliary fuel tank means for pumping fuel from said auxiliary fuel tank means to the fuel injection valve side of the engine;

water jacket means connected to said auxiliary fuel tank means for cooling the fuel which is stored in the auxiliary fuel tank means;

water pump means driven by said engine means to supply water from an external water source to an inlet of said water jacket means, wherein a first discharge passage means is connected to an outlet of said water jacket means;

cover means for covering said engine means, said fuel pump means, and the auxiliary fuel tank means, wherein the inlet of said water jacket means is configured at a lowest portion of said water jacket means when said engine means is in the second position; said outboard motor further comprising second discharge passage means attached to said water jacket means, said second discharge passage means being connected to said inlet, and is configured to be below the inlet when the engine means is in the second position.

8. An outboard motor, said outboard motor comprising:

engine means for providing a rotating force for driving a propeller, said engine means configured to be tiltable from a first position which is an operating position to a second position which is a tilted-up position;

drive means connected to said engine means for driving the propeller, wherein when said engine means is in a second position, said drive means is tilted upward;

auxiliary fuel tank means connected to said engine means for storing fuel returning from a fuel injection valve side of the engine means;

high pressure fuel pump means connected to said engine means and said auxiliary fuel tank means for pumping fuel from said auxiliary fuel tank means to the fuel injection valve side of the engine;

water jacket means connected to said auxiliary fuel tank means for cooling the fuel which is stored in the auxiliary fuel tank means;

water pump means driven by said engine means to supply water from an external water source to an inlet of said water jacket means, wherein a discharge passage means is connected to an outlet of said water jacket means;

cover means for covering said engine means, said fuel pump means, and the auxiliary fuel tank means, wherein the inlet of said water jacket means is configured at a lowest portion of said water jacket means when said engine means is in the second position, and wherein said outlet of said water jacket means is connected to said discharge passage means at a position which is below the outlet when the engine is in the second position.

* * * * *